United States Patent [19]
Noponen et al.

[11] 3,825,147
[45] July 23, 1974

[54] FILLER CAP

[75] Inventors: Harold W. Noponen, Flint; Tom B. Miller, Grand Blanc, both of Mich.

[73] Assignee: General Motors Corporation, Detroit, Mich.

[22] Filed: Oct. 10, 1972

[21] Appl. No.: 296,039

[52] U.S. Cl............ 220/44 A, 220/39 R, 220/24 GT
[51] Int. Cl........................................... B65d 51/16
[58] Field of Search..... 220/44, 44 A, 39 R, 24 GT; 55/212, 213

[56] References Cited
UNITED STATES PATENTS

| | | | |
|---|---|---|---|
| 1,987,869 | 1/1935 | Reichenbach | 220/44 A |
| 1,990,621 | 2/1935 | Stant | 220/44 A |
| 2,596,070 | 5/1952 | Friend | 220/44 A |
| 3,606,908 | 9/1971 | Riester | 55/213 |
| 3,724,707 | 4/1973 | Burgess | 220/44 A |

FOREIGN PATENTS OR APPLICATIONS

| | | | |
|---|---|---|---|
| 908,103 | 2/1954 | Germany | 220/44 A |

Primary Examiner—William I. Price
Assistant Examiner—R. E. Hart
Attorney, Agent, or Firm—Peter D. Sachtjen

[57] ABSTRACT

A filler cap for a motor vehicle fuel tank has a rolled thread engageable with a helical lip on the fuel tank filler neck and includes pressure and vacuum relief valves, and a relief valve filter.

1 Claim, 6 Drawing Figures

PATENTED JUL 23 1974  3,825,147
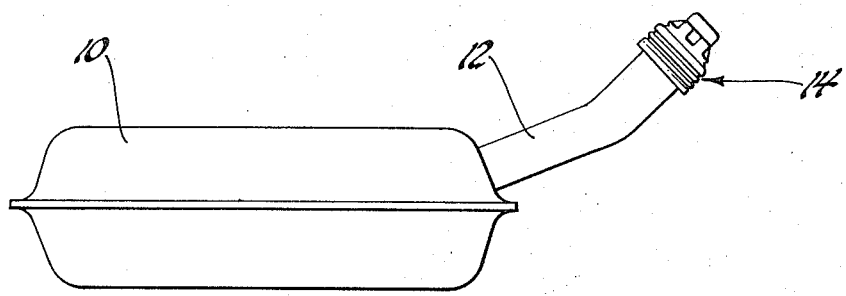
Fig. 1
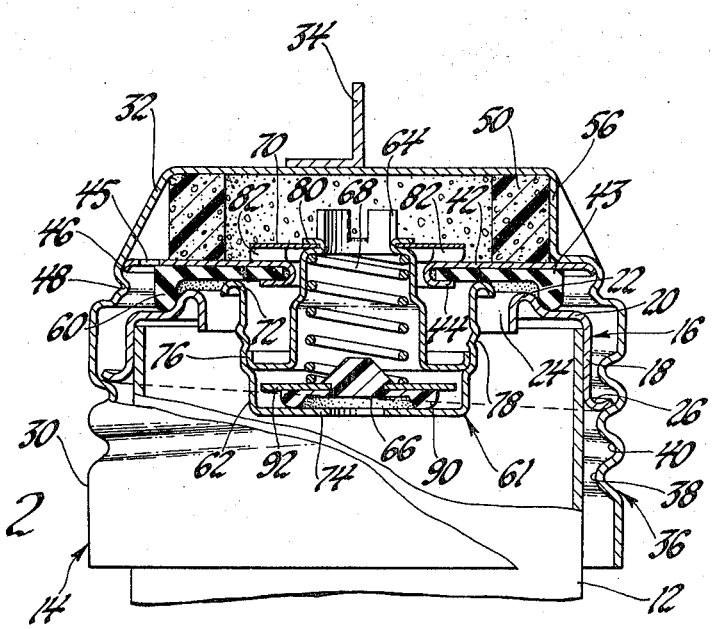
Fig. 2
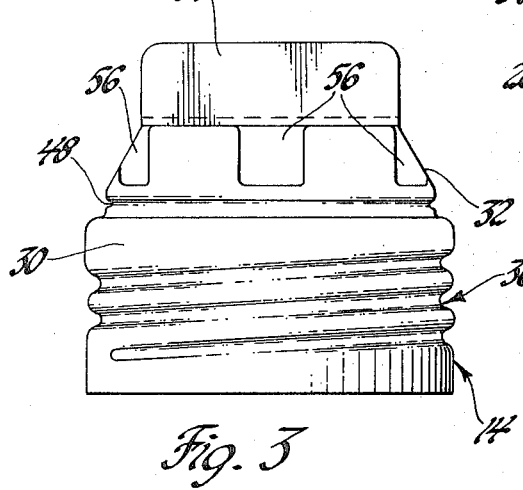
Fig. 3
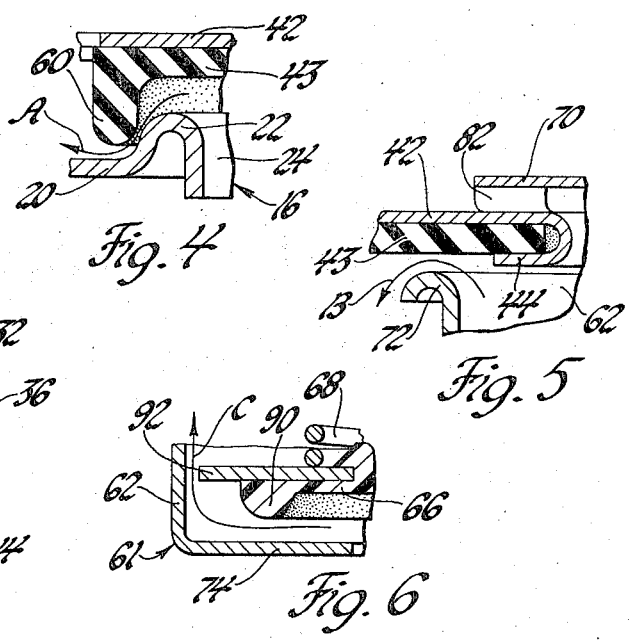
Fig. 4
Fig. 5
Fig. 6

FILLER CAP

The present invention relates to closure caps and, in particular, to a filler cap for sealing the filler neck of a motor vehicle fuel tank.

In sealed fuel systems for motor vehicles, the filler cap functions to maintain controlled pressure conditions for the fuel contained in the fuel tank. The cap should provide positive sealing with the filler neck to prevent escape of fuel in the closed position and gradual venting upon opening to prevent fuel loss from surging. When closed, maximum pressure and vacuum conditions may be controlled by internal valving in the cap.

A filler cap made in accordance with the present invention reliably provides positive means for accomplishing the aforementioned functions. The cap design is such that sealing is only at required seal interfaces. The filler cap includes a rolled helical thread which gradually engages a helical lip on the filler neck to permit a gradual pressure venting of the tank before complete removal of the cap. The cap rotatably carries a gasket which engages the filler neck to effect the primary cap seal at a first interface. A vacuum relief valve carried by the cap is resiliently biased against the primary cap gasket to provide inward bleeding under vacuum conditions at a second interface. A pressure relief valve carried by the cap is biased against the vacuum relief valve for providing pressure relief at a third interface. An annular filter in the cap surrounds the vapor flow path to the relief valves and prevents dirt from entering the valve assembly during vacuum relief. To prevent gasket wear, the primary cap gasket is swively connected to the cap and upon preliminary engagement with the filler neck frictionally engages the latter. By screwing the cap further onto the helical lip, the gasket is compressed without additional frictional movement.

The above and other features of the present invention will be apparent to one skilled in the art upon reading the following detailed description, reference being made to the accompanying drawings illustrating a preferred embodiment of the present invention in which:

FIG. 1 is a side elevational view of a motor vehicle fuel tank having a filler neck sealed by a filler cap made in accordance with the present invention;

FIG. 2 is an enlarged partially sectioned view of the filler cap of FIG. 1 showing the locked position on the filler neck;

FIG. 3 is an enlarged side elevational view of the filler cap of FIG. 1;

FIG. 4 is a fragmentary sectional view showing the filler cap and the filler neck in the cap venting position;

FIG. 5 is a fragmentary cross-sectional view showing the vacuum relief valving; and FIG. 6 is a fragmentary cross-sectional view showing the pressure relief valving.

Referring to FIG. 1 there is shown a motor vehicle fuel tank 10 including an upwardly projecting filler neck 12 having an opening which is sealed by a filler cap 14. When the filler cap 14 is removed, the fuel tank 10 is filled in a conventional manner through the filler neck 12. When the filler cap 14 is in a locked position, the fuel supply within the fuel tank 10 is subject to pressure and vacuum control in the manner described below.

Referring to FIG. 2, the filler neck 12 carries an annular filler neck adaptor 16 at its upper end. The filler neck adaptor 16 includes a cylindrical sleeve 18, an upper radially inwardly extending annular shoulder 20 having a circular rim 22 defining a fuel opening 24, and a lower outwardly turned helical lip 26. The sleeve 18 is pressed over the upper end of the filler neck 12 to fixedly retain the adaptor 16 thereon.

As shown in FIG. 3, the filler cap 14 includes a depending lower cylindrical sleeve 30, an upper frusto-conical dome 32 and an L-shaped handle 34 fixed to the top surface of the dome 32. The sleeve 30 includes a multiple turned inwardly formed helical screw thread 36. As shown in FIG. 2, the screw thread 36 defines a helical groove on the inner surface of the sleeve 30 as defined by alternate crests 38 and roots 40.

The helical lip 26 is adapted to cooperate with the lead surfaces of the crests 38 of the screw thread 36 to provide an axially advancing or retreating movement of the cap 14 with respect to the filler neck 12 upon rotation of the handle 34. This will provide a constant low torque opening or closing movement of the filler cap 14.

An annular gasket retaining ring 42 is rotatably carried by the filler cap 14. An elastomeric primary cap gasket 43 is fixedly carried by the retaining ring 42 by a reversely bent inner rim 44 which compressively grips the inner periphery of an elastomeric cap gasket 43. The rim 44 defines a circular valve opening. The outer portion of the retaining ring 42 is provided with venting holes 45. The retaining ring 42 further includes a downwardly extending conical rim 46 which loosely engages the inner surface of the dome 32. This permits swiveling relative rotative movement between the ring 42 and the filler cap 14. The retaining ring 42 is axially retained on the filler cap 14 by an inwardly formed annular retaining bead 48 formed at the transitional section between the dome 32 and the sleeve 30.

A cylindrical filter 50 is axially disposed between the dome 32 and the retaining ring 42 and circumferentially between the valve opening and the venting holes 45. The filter 50 is formed of a suitable filtering media such as polyurethane foam. The filter 50 is located on the dome 32 by inwardly projecting indentations 56. The lower surface of the filter 50 slidingly engages the top surface of the retaining ring 42.

The primary cap gasket 43 includes a downwardly axially projecting annular sealing lip 60 which is engageable with the shoulder 20. Upon engagement of the sealing lip 60 with the shoulder 20, the cap gasket 43 and the retaining ring 42 are frictionally retained on the adaptor 16. Upon further closing movement of the filler cap 14, the retaining ring 42 and the gasket 43 swivel with respect to the filler cap 14 to minimize frictional wear at the sealing interface.

Thus, as the cap 14 is rotated with a closing movement, the sealing lip 60 will be increasingly compressed between the retaining ring 42 and the shoulder 20. Sealing below the rim 22 prevents damage of the sealing surface during fueling. Upon opening movement, the cap venting is along the flow path indicated by arrow A in FIG. 4.

The valve assembly 61 is disposed in the valve opening defined by the rim 44. The valve assembly 61 comprises a valve cage 62, a spring retainer 64, a pressure relief valve 66, a pressure relief spring 68, and a vacuum relief spring 70.

The valve cage 62 is a generally cylindrical member and upwardly terminates with an outwardly rolled rim 72. The rim 72 is adapted to sealingly engage the lower surface of the gasket 43. The vacuum relief spring 70, as hereafter described in greater detail, biases the rim 72 against the gasket 43. The lower end of the valve cage 62 is provided with an annular valve seat 74. The outer periphery of pressure relief valve 66 engages the valve seat 74. The spring retainer 64 includes a lower annular flange 76 which is staked at 78 to the inner periphery of the valve cage 62. The spring retainer 64 includes a reduced diameter upper end which is loosely received in the valve opening of the retaining ring 42 and which projects through a center opening in the vacuum relief spring 70. The spring retainer 64 is fixedly attached at its upper end to the vacuum relief spring 70 by outwardly formed tangs 80. The spring 68 is compressively retained between the tangs 80 and the pressure relief valve 66.

The vacuum relief spring 70 includes a plurality of arcuate downwardly curved spring arms 82. In assembly, the spring arms 82 are normally flexed to provide upward biasing for the spring retainer 64. This biases the rim 72 against the gasket 43.

Thus, as shown in FIG. 5, when predetermined vacuum conditions in the fuel tank 10 are exceeded, this pressure differential on the valve cage 62 downwardly urges the latter to space the rim 72 from the gasket 43 against the biasing provided by the flexed arms 82 of the spring 70. This will provide a vacuum relief flow path indicated by arrow B. The air bleeding into the tank 10 will pass through the venting holes 45 and will be filtered by the filter 50. This will prevent contaminants from depositing at the sealing interfaces which would impair the valving action of the relief valves.

The pressure relief valve 66 includes an annular sealing bead 90 which engages the top surface of the valve seat 74 to provide an annular pressure sealing interface. The valve 66 includes an annular backing ring 92. The pressure relief spring 68 normally biases the valve 66 into sealing engagement with the seat 74. As shown in FIG. 6, when a predetermined pressure in the tank is exceeded, the pressure differential acts on the pressure relief valve 66 to urge it upwardly against the biasing of the spring 68. This provides a pressure relief flow path between the bead 90 and the seat 74 as indicated by arrow C.

The above construction thus provides a filler cap assembly having pressure and vacuum sealing at only three sealing interfaces; the cap removal interface wherein the flow is along flow path A as shown in FIG. 4, vacuum relief interface wherein the flow is along flow path B as shown in FIG. 5, and pressure relief interface wherein the flow is along flow path C as shown in FIG. 6.

Although only one form of this invention has been shown and described, other forms will be readily apparent to those skilled in the art. Therefore, it is not intended to limit the scope of this invention by the embodiment selected for the purpose of this disclosure but only by the claims which follow.

What is claimed is:

1. A filler cap for a fuel tank filler neck having a center fuel opening and an outwardly projecting helical lip formed on an outer surface thereof comprising: a cap member having a dome section and a depending cylindrical sleeve encircling said filler neck, said sleeve including helical thread adapted to engage the helical lip on the filler neck to provide a constant, low torque opening and closing movement between the cap member and the filler neck upon rotation of the former; a retaining ring rotatably carried by the cap member for relative rotation with respect thereto, said retaining ring including a center valve opening; an annular elastomeric gasket carried by the retaining ring, said gasket frictionally engaging the filler neck and swiveling with respect to the filler cap upon closing movement to thereby minimize frictional gasket wear; venting holes formed in the retaining ring; filter means carried between the gasket and the dome and disposed between the venting holes and the valve opening for filtering air passing therethrough; a vacuum relief valve disposed in the valve opening and having a valve member yieldingly biased against the gasket and adapted to normally engage the latter, the pressure differential acting on the vacuum relief valve under predetermined vacuum conditions to permit vacuum relief in a flow path between the venting holes, the filter and the tank; and a pressure relief valve carried by the vacuum relief valve and yieldingly biased thereagainst, the pressure differential acting on the pressure relief valve under predetermined pressure conditions to permit pressure relief.

* * * * *